(12) United States Patent
Gronvall

(10) Patent No.: US 10,790,899 B2
(45) Date of Patent: Sep. 29, 2020

(54) OPTICAL TAPPING IN AN INDEXING ARCHITECTURE

(71) Applicant: COMMSCOPE TECHNOLOGIES LLC, Hickory, NC (US)

(72) Inventor: Erik J. Gronvall, Hickory, NC (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/477,781

(22) PCT Filed: Jan. 11, 2018

(86) PCT No.: PCT/US2018/013329
§ 371 (c)(1),
(2) Date: Jul. 12, 2019

(87) PCT Pub. No.: WO2018/132576
PCT Pub. Date: Jul. 19, 2018

(65) Prior Publication Data
US 2019/0372663 A1    Dec. 5, 2019

Related U.S. Application Data

(60) Provisional application No. 62/445,561, filed on Jan. 12, 2017, provisional application No. 62/558,105, filed on Sep. 13, 2017.

(51) Int. Cl.
*H04B 10/035*     (2013.01)
*H04B 10/25*      (2013.01)
*H04B 10/2581*    (2013.01)

(52) U.S. Cl.
CPC ...... *H04B 10/035* (2013.01); *H04B 10/2503* (2013.01); *H04B 10/2581* (2013.01)

(58) Field of Classification Search
CPC ...... G02B 6/3885; G02B 6/3895; G02B 6/00; G02B 6/2817; G02B 6/387; G02B 6/4246;
(Continued)

(56) References Cited

U.S. PATENT DOCUMENTS 7,444,056 B2    10/2008  Allen et al.
7,744,286 B2     6/2010  Lu et al.
(Continued)

FOREIGN PATENT DOCUMENTS

EP    1 981 185 A1      10/2008
EP    1981185 A1 *     10/2008    ........... G02B 6/4446
(Continued)

OTHER PUBLICATIONS

International Search Report and Written Opinion of the International Searching Authority for International Patent Application No. PCT/US2018/013329 dated Apr. 30, 2018, 12 pages.

*Primary Examiner* — Tanya T Motsinger
(74) *Attorney, Agent, or Firm* — Merchant & Gould P.C.

(57) ABSTRACT

An indexing system includes an indexing component; a redundant optical path; and a fiber tap arrangement. Multiple indexing components can be daisy-chained together in the indexing system. The redundant optical path is created between any forward port and any rearward port in the network. Multiple redundant optical paths can be created within the network. One or more tap arrangements can be disposed along each redundant optical path. Accordingly, feed signals in a bidirectional indexing environment can be supplied to each drop line along the redundant optical path from either direction without recabling.

22 Claims, 11 Drawing Sheets

(58) Field of Classification Search
CPC .. H04J 14/0205; H04J 14/0216; H04B 10/25; H04B 10/27; H04B 10/07; H04B 10/0793; H04B 10/2503
See application file for complete search history.

(56) References Cited

U.S. PATENT DOCUMENTS

| | | | |
|---|---|---|---|
| RE43,762 E | 10/2012 | Smith et al. | |
| 9,207,421 B2* | 12/2015 | Conner | G02B 6/4452 |
| 9,348,096 B2 | 5/2016 | Kmit et al. | |
| 9,557,498 B2* | 1/2017 | Loeffelholz | G02B 6/3895 |
| 9,851,525 B2* | 12/2017 | Loeffelholz | G02B 6/4471 |
| 10,050,703 B2* | 8/2018 | Smith | H04B 10/07955 |
| 10,317,639 B2* | 6/2019 | Rousseaux | G02B 6/4471 |
| 2004/0109164 A1* | 6/2004 | Horii | G01B 9/0201 |
| | | | 356/479 |
| 2005/0036749 A1 | 2/2005 | Vogel et al. | |
| 2006/0008210 A1* | 1/2006 | Cornell | G02B 6/2804 |
| | | | 385/48 |
| 2006/0104638 A1* | 5/2006 | Chung | H04J 14/025 |
| | | | 398/71 |
| 2013/0034336 A1 | 2/2013 | Cassell et al. | |
| 2013/0308916 A1* | 11/2013 | Buff | G02B 6/2804 |
| | | | 385/135 |
| 2013/0330073 A1* | 12/2013 | Sakamoto | H04B 10/07 |
| | | | 398/38 |
| 2015/0378112 A1* | 12/2015 | Marcouiller | G02B 6/3825 |
| | | | 385/56 |
| 2016/0025929 A1* | 1/2016 | Mei | G02B 6/2817 |
| | | | 359/230 |
| 2016/0149663 A1* | 5/2016 | Ji | H04J 14/0204 |
| | | | 398/48 |
| 2016/0238810 A1* | 8/2016 | Hubbard | G02B 6/4472 |
| 2016/0301467 A1* | 10/2016 | Ji | H04B 10/2503 |
| 2017/0085318 A1* | 3/2017 | Ruchet | H04B 10/07955 |
| 2017/0227460 A1* | 8/2017 | Yang | G01N 21/7703 |

FOREIGN PATENT DOCUMENTS

| | | |
|---|---|---|
| JP | H10-32545 A | 2/1998 |
| WO | 2013/149150 A1 | 10/2013 |
| WO | 2014/167447 A1 | 10/2014 |
| WO | 2014/190281 A1 | 11/2014 |
| WO | 2014/197894 A1 | 12/2014 |
| WO | 2016/057411 A1 | 4/2016 |
| WO | 2017/132388 A1 | 8/2017 |
| WO | 2018/231833 A1 | 12/2018 |

* cited by examiner

OPTICAL TAPPING IN AN INDEXING ARCHITECTURE

CROSS-REFERENCE TO RELATED APPLICATIONS

This application is a National Stage Application of PCT/US2018/013329, filed on Jan. 11, 2018, which claims the benefit of U.S. Patent Application Ser. No. 62/445,561, filed on Jan. 12, 2017, and claims the benefit of U.S. patent application Ser. No. 62/558,105, filed on Sep. 13, 2017, the disclosures of which are incorporated herein by reference in their entireties. To the extent appropriate, a claim of priority is made to each of the above disclosed applications.

BACKGROUND

Passive optical networks are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

SUMMARY

Aspects of the present disclosure relate to systems in which optical signals are tapped at one or more network nodes.

Some aspects of the disclosure are directed to an example optical network node including an optical tap, an input line, a first output line, and a second output line. The optical tap asymmetrically splits out a first portion of any optical signal received at the input line from a remainder of the optical signal. The optical tap splits the first portion of the optical signal onto the first output line. The optical tap allows the remainder of the optical signal to pass to the second output line.

The housing supports the optical tap. An input is optically couples to the input line of the optical tap. A first output optically couples to the first output line of the optical tap. The first portion of the optical signal is carried over the first output line, to the first output, and out of the housing without being further split. The second output optically couples to the second output line of the optical tap. The remainder of the optical signal is carried over the second output line, to the second output, and out of the housing without being further split.

In some implementations, the input includes a de-mateable connection interface location. In an example, the de-mateable connection interface location defines a connectorized end of a cable. In another example, the de-mateable connection interface location defines an optical port configured to receive a connectorized end of a cable. In certain implementations, the de-mateable connection interface location is ruggedized (i.e., mechanically robust and configured to be environmentally sealed). In other implementations, the input includes a splice region disposed within the housing.

In some implementations, the input is accessible from an exterior of the housing. In other implementations, the input is disposed within an interior of the housing and is not accessible from an exterior of the housing.

In some implementations, the first and second outputs include first and second de-mateable connection interface locations, respectively. In examples, the first and second de-mateable connection interface locations define connectorized ends of cables. In examples, the first and second de-mateable connection interface locations define optical ports configured to receive connectorized ends of cables. In certain implementations, the de-mateable connection interface locations are ruggedized. In other implementations, at least one of the first and second outputs includes a splice region disposed within the housing.

In some implementations, one or both of the first and second outputs are accessible from an exterior of the housing. In other implementations, the first and second outputs are disposed within an interior of the housing and are not accessible from an exterior of the housing.

In certain implementations, the optical tap is disposed within an interior of the housing.

In certain implementations, the housing is mounted on a cable spool to rotate in unison with the cable spool to dispense an optical cable from the cable spool. The optical cable has a first end optically coupled to the optical tap via the input.

In certain implementations, two or more of the optical network nodes can be daisy-chained together as part of an optical network. In such implementations, the second output of one of the optical network nodes in a chain is optically coupled to the input of a subsequent one of the optical network nodes.

In an example, optical signals carried over the input line of a first optical network node in the chain are split (i.e., power split) at a first tap so that a portion of the optical signal passes to the first output and a majority of the optical signal passes to the second output.

In certain examples, the optical taps of the optical network nodes are configured to split off a common power percentage of the optical signals.

In some implementations, the chain of optical network nodes is suitable for use in a fiber distribution environment inside a building (e.g., a multi-dwelling unit, a shopping mall, an office building, etc.). In some such examples, a subscriber line optically couples the first output to a subscriber. For example, the portion of the optical signal tapped at each optical network node is carried over the first output and over a subscriber line to a room of the multi-dwelling unit, a shop at the shopping mall, or an office of the office building.

In certain implementations, the subscriber line carries the portion of the optical signal from the first output to the subscriber without further splitting the portion of the optical signal.

In certain implementations, a distribution cable is optically coupled to the first output of an optical network node. The distribution cable leads to an optical splitter disposed at a location spaced from the housing.

In certain examples, the optical splitter is disposed at a remote location from the housing of the optical network node.

In certain examples, the housing includes a first housing piece and a second housing piece that couple together at a sealing region to seal the interior of the housing. The sealing region defines cable pass-through locations through which cables enter the interior of the housing to reach the input cable interface location, the first output cable interface location, and/or the second output cable interface location.

In certain implementations, an indexing component has a de-mateable first multi-fiber connection location, a de-mateable second multi-fiber connection location, a de-mateable first output connection location, and a de-mateable second output connection location. The indexing component indexes optical lines between the first and second multi-fiber connection locations while dropped optical fibers are routed to the first and second output connection locations. The first multi-fiber connection location is configured to receive feed signals in a forward direction and the second multi-fiber connection location being configured to receive feed signals in a reverse direction. A redundant fiber path extends between the first output connection location and the second output connection location. The optical network node is disposed along the redundant fiber path.

Other aspects of the disclosure are directed to an optical network architecture including a chain of indexing components. Optical signals carried along the optical network are dropped in a predetermined pattern at the indexing components. One or more tap arrangements are coupled to at least one of the dropped lines to tap off signals from the dropped line. One or more passive optical splitters may split one or more of the tapped signals.

In certain implementations, the indexing components can have hardened/ruggedized connection locations.

In some implementations, the indexing components and tap arrangements are disposed within a building and configured for indoor use. In other implementations, one or more of the indexing components and tap arrangements is disposed outdoors and configured for outdoor use.

In some implementations, the optical network supports only single direction indexing of the optical signals. In other implementations, the optical network supports bi direction indexing of the optical signals.

Other aspects of the disclosure are directed to an indexed fiber optic network system including a terminal, a redundant fiber path, and a fiber tap arrangement. The terminal has a first multi-fiber connection location, a second multi-fiber connection location, a first output port, and a second output port. The terminal includes a first optical fiber extending from the first multi-fiber connection location to the first output port, a second optical fiber extending from the second multi-fiber connection location to the second output port, and additional optical fibers indexed between the first and second multi-fiber connection locations. The first multi-fiber connection location is configured to receive feed signals in a forward direction and second multi-fiber connection location is configured to receive feed signals in a reverse direction. The redundant fiber path extends between the first output port and the second output port. The fiber tap arrangement is disposed along the redundant fiber path. The fiber tap arrangement includes a first coupler, a second coupler, and a 2×N optical splitter. The first coupler taps off the feed signal from the redundant fiber path if the feed signal is carried in the first direction. The second coupler taps off the feed signal from the redundant fiber path if the feed signal is carried in the second direction. The first and second couplers provide any tapped off feed signals to the 2×N optical splitter.

In certain implementations, the redundant fiber path includes a first optical fiber coupled to the first output port and a second optical fiber coupled to the second output port.

In certain implementations, the first coupler of the fiber tap arrangement is disposed along the first optical fiber and the second coupler of the fiber tap arrangement is disposed along the second optical fiber.

In certain implementations, the redundant fiber path includes a single optical fiber.

In certain implementations, the first and second couplers of the fiber tap arrangement are disposed along the single optical fiber.

In certain implementations, the fiber tap arrangement is one of a plurality of fiber tap arrangements. Each fiber tap arrangement includes a respective first coupler, a respective second coupler, and a respective 2×N optical splitter. Each first coupler taps off the feed signal from the redundant fiber path if the feed signal is carried in the first direction. Each second coupler taps off the feed signal from the redundant fiber path if the feed signal is carried in the second direction. The first and second couplers provide any tapped off feed signals to the respective 2×N optical splitters.

In certain implementations, each first coupler is disposed along the first optical fiber and each second coupler is disposed along the second optical fiber.

In certain implementations, each of the first and second couplers is disposed along the single optical fiber.

In certain implementations, the first multi-fiber connection location includes an input port.

In certain implementations, the first multi-fiber connection location includes an input connector terminating a stub cable.

In certain implementations, the second multi-fiber connection location includes a port.

In certain implementations, the second multi-fiber connection location includes a connector terminating a stub cable.

In certain implementations, the first output port is one of a plurality of first output ports. Each first output port is configured to receive a respective optical fiber extending from the first multi-fiber cable port.

In certain implementations, the second output port is one of a plurality of second output ports, each second output port being configured to receive a respective optical fiber extending from the second multi-fiber cable port.

In certain implementations, the terminal is one of a plurality of terminals. Each terminal has a respective first multi-fiber cable port, a respective second multi-fiber cable port, a respective first output port, and a respective second output port. Each terminal includes an optical fiber extending from the first multi-fiber cable port to the first output port, another optical fiber extending from the second multi-fiber cable port to the second output port, and additional optical fibers indexed between the respective first and second multi-fiber cable ports. The terminals are configured to be daisy-chained together.

Other aspects of the disclosure are directed to a bi-directional indexing system in which signals supplied from a central office can be selectively routed in a forward or rearward direction. The system includes a first terminal, a second terminal, an optical cable, a redundant fiber path, and a tap arrangement. The first terminal has a first multi-fiber cable port, a second multi-fiber cable port, a first output port, and a second output port. The first terminal includes a first optical fiber extending from the first multi-fiber cable port to the first output port, a second optical fiber extending from the second multi-fiber cable port to the second output port, and additional optical fibers indexed between the first and second multi-fiber cable ports. Signals supplied in the forward direction are received at the first multi-fiber cable port. The second terminal has a first multi-fiber cable port, a second multi-fiber cable port, a first output port, and a second output port. The second terminal includes a first optical fiber extending from the first multi-fiber cable port to the first output port, a second optical fiber extending from the second multi-fiber cable port to the second output port, and additional optical fibers indexed between the first and second multi-fiber cable ports. The first multi-fiber cable port is configured to receive feed signals in a forward direction and second multi-fiber cable port being configured to receive feed signals in a reverse direction. Signals supplied in the rearward direction are received at the second multi-fiber cable port. The optical cable optically couples the second multi-fiber cable port of the first terminal to the first multi-fiber cable port of the second terminal. The redundant fiber path extends between the first output port of the first terminal and the second output port of the second terminal. The fiber tap arrangement is disposed along the redundant fiber path. The fiber tap arrangement includes a first coupler, a second coupler, and a 2×N optical splitter. The first coupler taps off the feed signal from the redundant fiber path if the feed signal is carried in the first direction. The second coupler taps off the feed signal from the redundant fiber path if the feed signal is carried in the second direction. The first and second couplers provide any tapped off feed signals to the 2×N optical splitter.

In certain implementations, the redundant fiber path includes a first optical fiber coupled to the first output port of the first terminal and a second optical fiber coupled to the second output port of the second terminal.

In certain implementations, the first coupler of the fiber tap arrangement is disposed along the first optical fiber and the second coupler of the fiber tap arrangement is disposed along the second optical fiber.

In certain implementations, the redundant fiber path includes a single optical fiber.

In certain implementations, the first and second couplers of the fiber tap arrangement are disposed along the single optical fiber.

In certain implementations, the fiber tap arrangement is one of a plurality of fiber tap arrangements. Each fiber tap arrangement includes a respective first coupler, a respective second coupler, and a respective 2×N optical splitter. Each first coupler taps off the feed signal from the redundant fiber path if the feed signal is carried in the first direction. Each second coupler taps off the feed signal from the redundant fiber path if the feed signal is carried in the second direction. The first and second couplers provide any tapped off feed signals to the respective 2×N optical splitters.

In certain implementations, the first output port of one of the first and second terminals is one of a plurality of first output ports. Each first output port is configured to receive a respective optical fiber extending from the first multi-fiber cable port.

In certain implementations, the second output port of one of the first and second terminals is one of a plurality of second output ports. Each second output port is configured to receive a respective optical fiber extending from the second multi-fiber cable port.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

The present disclosure is directed to uses for optical tapping in optical networks, including networks having an indexing architecture. For example, optical tapping can be used to provide redundancy to lines dropped off along an indexing network having a bidirectional architecture, can be used to simplify cabling an indexing architecture within a multi-dwelling unit, and/or can be used to simplify installation of passive optical networks.

As will be understood by those skilled in the art, the terms "forward" and "rearward" when discussing bidirectional indexing architectures are used for convenience and not meant to be literal. Bidirectional indexing networks connect to one or more signal sources at two points (e.g., the network can loop around to the same signal source, opposite ends of the network can connect to different signal sources capable of providing the same signal, etc.). Forward signals are signals introduced into the network at a first of the points. Rearward signals are signals introduced into the network at a different point and able to reach all portions of the network that the forward signals could reach.

Figure 1:
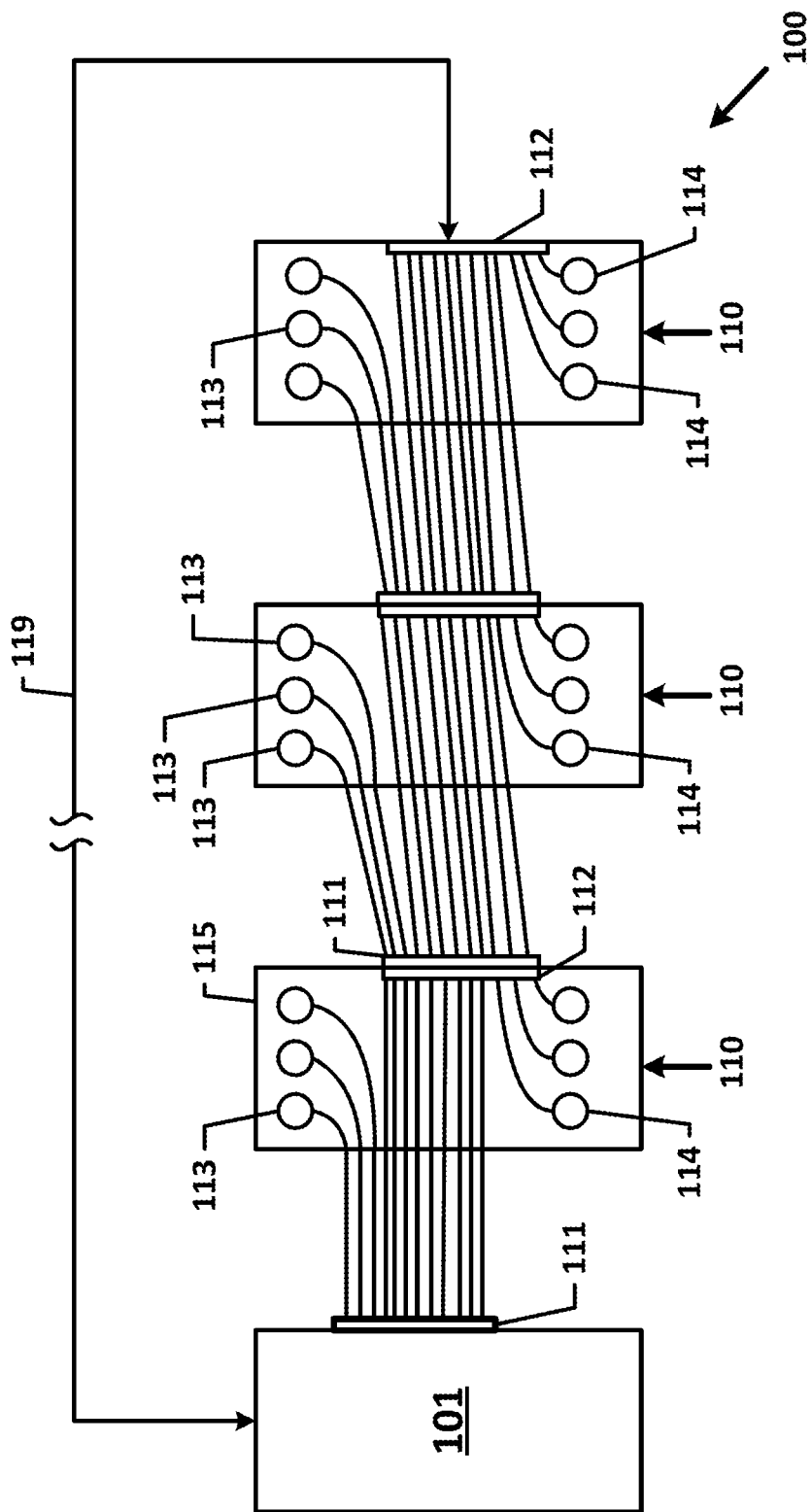
FIG. 1 illustrates an indexing network having a bidirectional architecture.

FIG. 1 illustrates an example fiber network 100 having an indexing architecture. The fiber network 100 includes a signal source 101 (e.g., a central office, a fiber distribution hub, a headend, etc.) and at least one indexing component (e.g., terminal or a cable) 110. Each indexing component 110 includes a first demateable multi-fiber connection location 111, a second demateable multi-fiber connection location 112, a forward demateable output connection location 113, and a rearward demateable output connection location port 114.

Each indexing component 110 may include a housing 115. In some examples, the housing 115 is rigid. In other examples, the housing is flexible. In some examples, the housing 115 is enterable. In other examples, the housing 115 has a sealed interior that is not enterable without breaking the housing 115. In other examples, the indexing component 110 may be devoid of a housing 115.

Each demateable connection location 111, 112, 113, 114 can include a plug connector, a female connector, or an adapter port configured to receive a plug connector. Some example plug connectors include ferrules that hold one or more optical fibers in a sequence. Other example plug connectors include ferruleless plug connectors that hold one or more optical fibers in a sequence. In certain implementations, each demateable connection location 111, 112, 113, 114 can be hardened/ruggedized. As the term is used herein, a hardened/ruggedized demateable connection location is environmentally sealed and includes a twist to secure fastener (e.g., nuts, threaded couplers, bayonet style fasteners).

Each demateable output connection location can be either a single-fiber connection location or a multi-fiber connection location. At least one optical fiber extends between the first multi-fiber connection location 111 and the forward output connection location 113. At least another optical fiber extends between the second multi-fiber connection location 112 and the rearward output connection location 114. Additional optical fibers are indexed between the first and second multi-fiber connection locations 111, 112. Examples of indexing optical fibers between multi-fiber connection locations can be found in U.S. Pat. No. 9,348,096, U.S. Publication No. 2015/0378112, U.S. Publication No. 2016/0238810, and PCT Publication No. WO 2016/057411, the disclosures of which are hereby incorporated herein by reference.

Distribution cables optically coupled to the forward and rearward output connection locations 113, 114 to connect an F2 part of the network 100 (e.g., subscribers) to the signal source 101. In some implementations, the distribution cables are single-fiber cables having connectorized ends. In other implementations, one or more of the distribution cables are multi-fiber cables having connectorized ends. In certain implementations, the connectorized ends are ruggedized (e.g., are environmentally sealed and include a robust twist-to-lock connection).

In some implementations, the first multi-fiber connection location 111 includes a multi-fiber port. In other implementations, the first multi-fiber connection location 111 includes a multi-fiber connector. For example, the first multi-fiber connection location 111 can be defined by a multi-fiber connector (e.g., an MPO connector or an HMFOC connector) terminating a stub cable extending outwardly from a housing 115 of the indexing component 110.

In some implementations, the second multi-fiber connection location 112 includes a multi-fiber port. In other implementations, the second multi-fiber connection location 112 includes a multi-fiber connector. For example, the second multi-fiber connection location 112 can be defined by a multi-fiber connector (e.g., an MPO connector or an HMFOC connector) terminating a stub cable extending outwardly from a housing 115 of the indexing component 110.

In some implementations, the forward connection location 113 is one of a plurality of forward connection locations 113 of the component 110. In the example shown, the indexing component 110 includes three forward connection locations 113. In other examples, the component 110 may have a greater or lesser number (e.g., two, four, six, eight, twelve, etc.) of forward connection locations 113.

In some implementations, the rearward connection location 114 is one of a plurality of rearward connection locations 114 of the component 110. In the example shown, the indexing component 110 includes three rearward connection locations 114. In other examples, the component 110 may have a greater or lesser number (e.g., two, four, six, eight, twelve, etc.) of rearward connection locations 114.

In certain implementations, the component 110 has the same number of forward connection locations 113 as rearward connection locations 114.

In certain implementations, multiple indexing components 110 can be daisy-chained together so that the second multi-fiber connection location 112 of a first component 110 receives the first multi-fiber connection location 111 of a second component 110. The first multi-fiber connection location 111 of the first component 110 is optically coupled to the signal source 101; The second multi-fiber connection location 112 of the last component 110 in the daisy-chain is optically coupled to the signal source 101 so that the component 110 are optically connected in a loop with respect to the signal source 101.

The loop can start at signal source 101, extend through the daisy-chain of indexing components 110, and then return to the signal source 101 (see fiber line 119 in FIG. 1) to complete the loop. The first multi-fiber connection locations 111 of the indexing components 110 can be referred to as a forward feed connection locations and the second multi-fiber connection locations 112 can be referred to as a reverse feed connection location. Signals can be forward-fed from the signal source 101 to the distribution cables of the F2 portion of the network 100 through the first multi-fiber connection locations 111. Signals can be reverse-fed through the F2 portion of the network 100 through the second multi-fiber connection locations 112.

In accordance with some aspects of the disclosure, an optical network architecture includes a chain of indexing components. Optical signals carried along the optical network are dropped in a predetermined pattern at the indexing components. One or more tap arrangements are coupled to at least one of the dropped lines to tap off signals from the dropped line. One or more passive optical splitters may split one or more of the tapped signals.

In certain implementations, the indexing components can have hardened/ruggedized connection locations.

In some implementations, the indexing components and tap arrangements are disposed within a building and configured for indoor use. In other implementations, one or more of the indexing components and tap arrangements is disposed outdoors and configured for outdoor use.

In some implementations, the optical network supports only single direction indexing of the optical signals. In other implementations, the optical network supports bidirection indexing of the optical signals.

In certain implementations, an indexing component has a demateable first multi-fiber connection location, a demateable second multi-fiber connection location, a demateable first output connection location, and a demateable second output connection location. The indexing component indexes optical lines between the first and second multi-fiber connection locations while dropped optical fibers are routed to the first and second output connection locations. The first multi-fiber connection location is configured to receive feed signals in a forward direction and the second multi-fiber connection location being configured to receive feed signals in a reverse direction. A redundant fiber path extends between the first output connection location and the second output connection location. The optical network node is disposed along the redundant fiber path.

Figure 2:
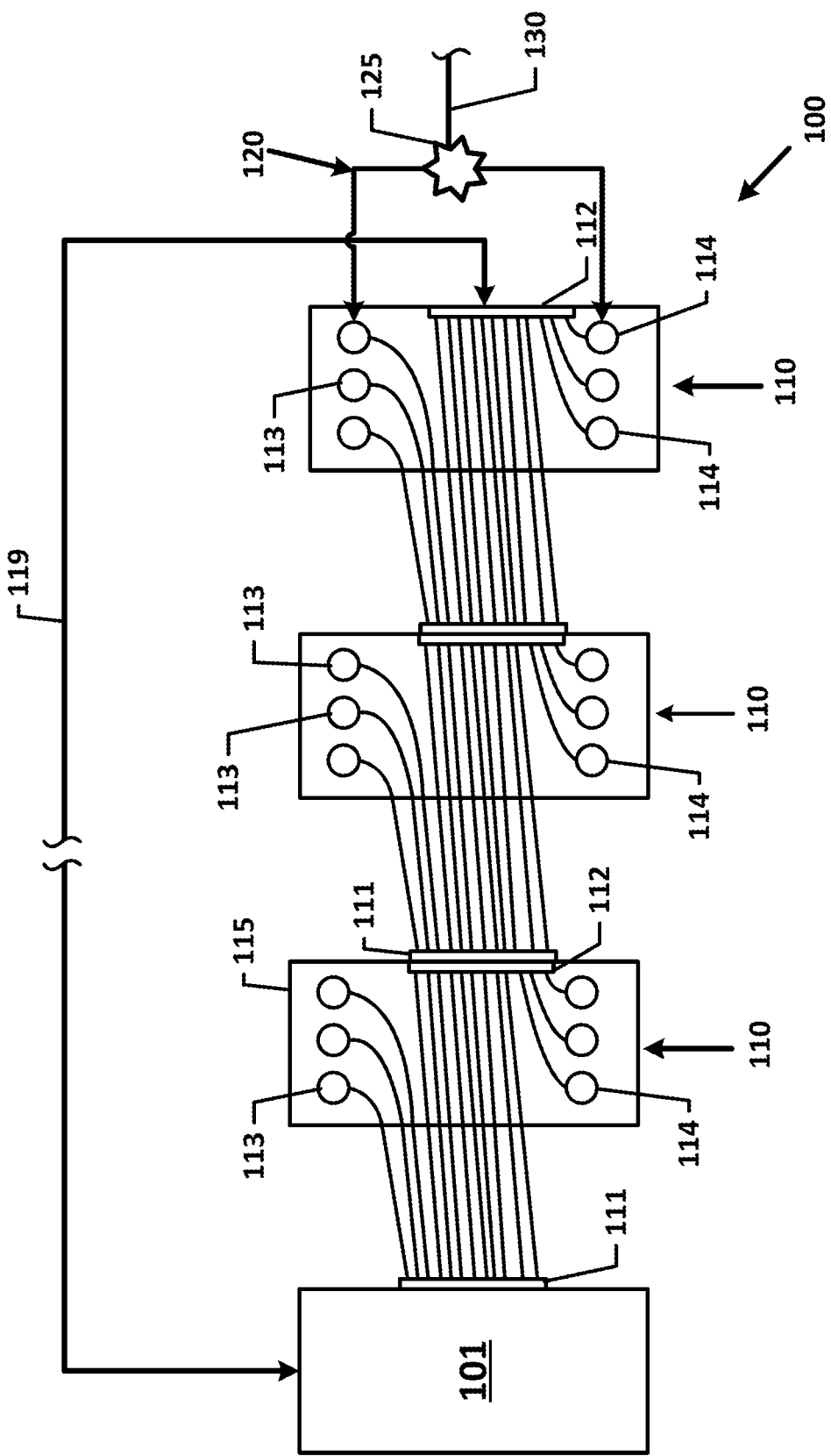
FIG. 2 illustrates the indexing network of FIG. 1 with a looped cable pathway provided between a forward port and a rearward port of a terminal.

As shown in FIG. 2, one or more looped cable pathways can be provided along the indexing network. The looped cable pathways form a loop between a forward direction output port and a rearward direction output port. One or more drop lines can be optically coupled to the indexing network along the looped cable pathway(s). Accordingly, if a break occurs in the network 100, the signals can be switched from a forward direction to a rearward direction.

Figure 7:
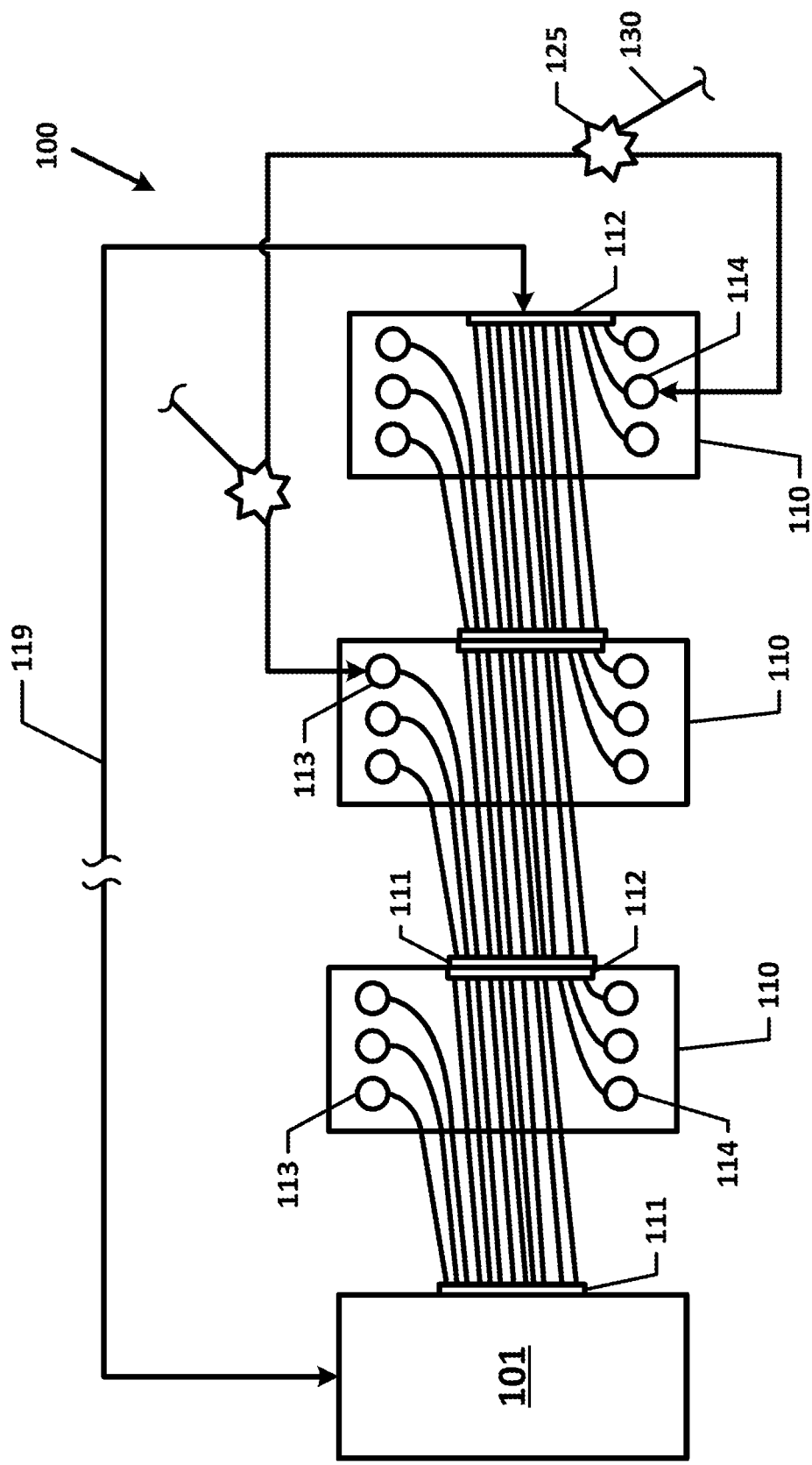
FIG. 7 illustrates the indexing network of FIG. 1 with a looped cable pathway provided between a forward port of a first terminal and a rearward port of a second terminal.

For example, a redundant optical pathway 120 can be provided between one of the forward outputs 113 of the network 100 and one of the rearward outputs 114 of the network 100. In some implementations, the redundant pathway 120 can be between forward and rearward outputs 113, 114 of the same component 110 (see FIG. 2). In other implementations, the redundant pathway 120 can be between forward and rearward outputs 113, 114 of different indexing components 110 (see FIG. 7).

When the signal source 101 is sending out feed signals in a forward direction, the signals are provided to the first multi-fiber connection locations 111 of the indexing components 110 and routed to the forward outputs 113 of the indexing components 110. Accordingly, the signals would be carried along the redundant optical pathway 120 from the forward connection location 113. When the signal source 101 is sending out feed signals in a rearward direction, the signals are provided to the second multi-fiber connection locations 112 of the indexing components 110 and routed to the rearward outputs 113 of the indexing components 110. Accordingly, the signals would be carried along the redundant optical pathway 120 from the rearward connection location 113.

Figure 3:
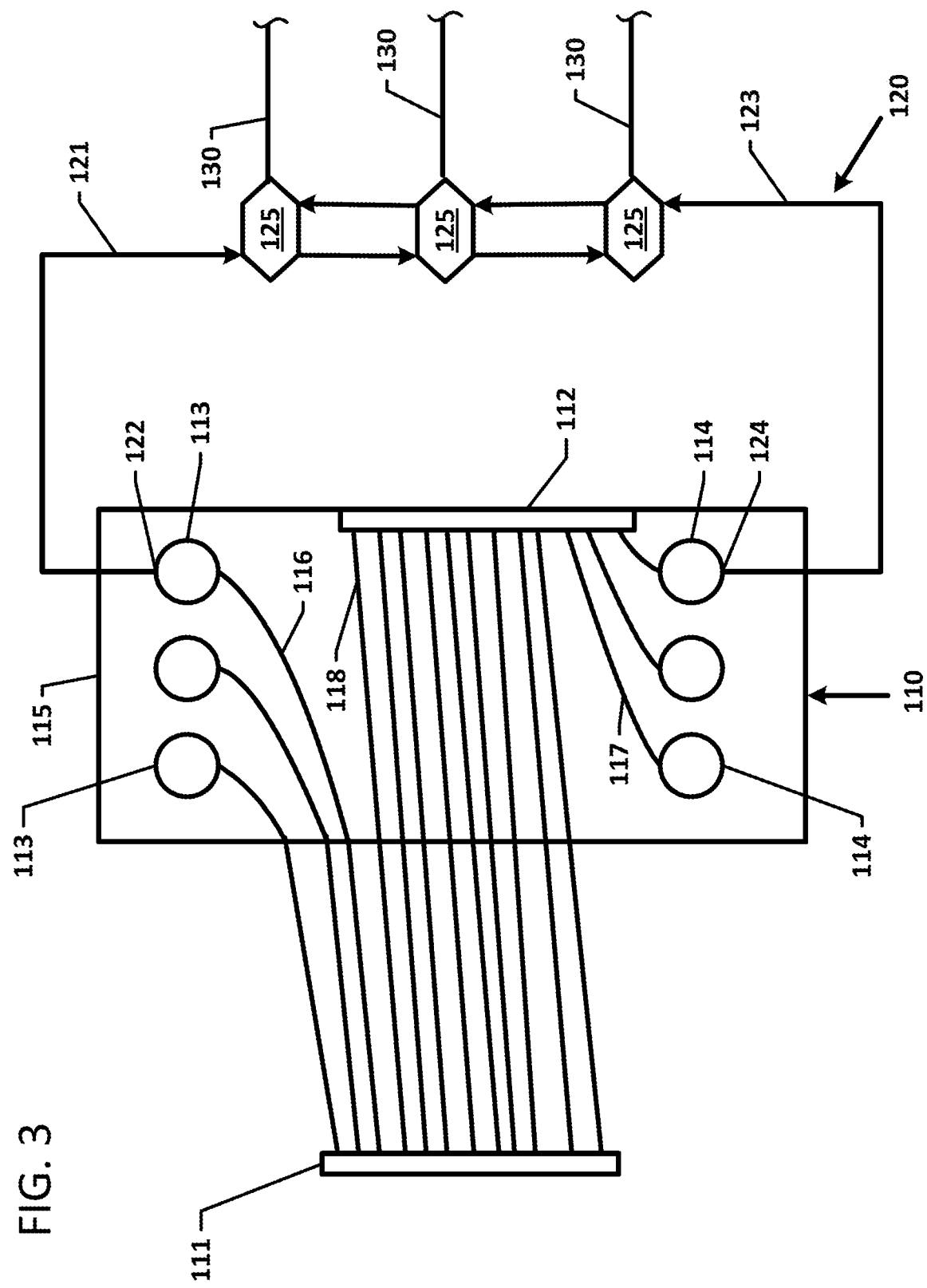
FIG. 3 is an enlarged view of an example implementation of the looped cable pathway of FIG. 2 including tap arrangements.
Figure 5:
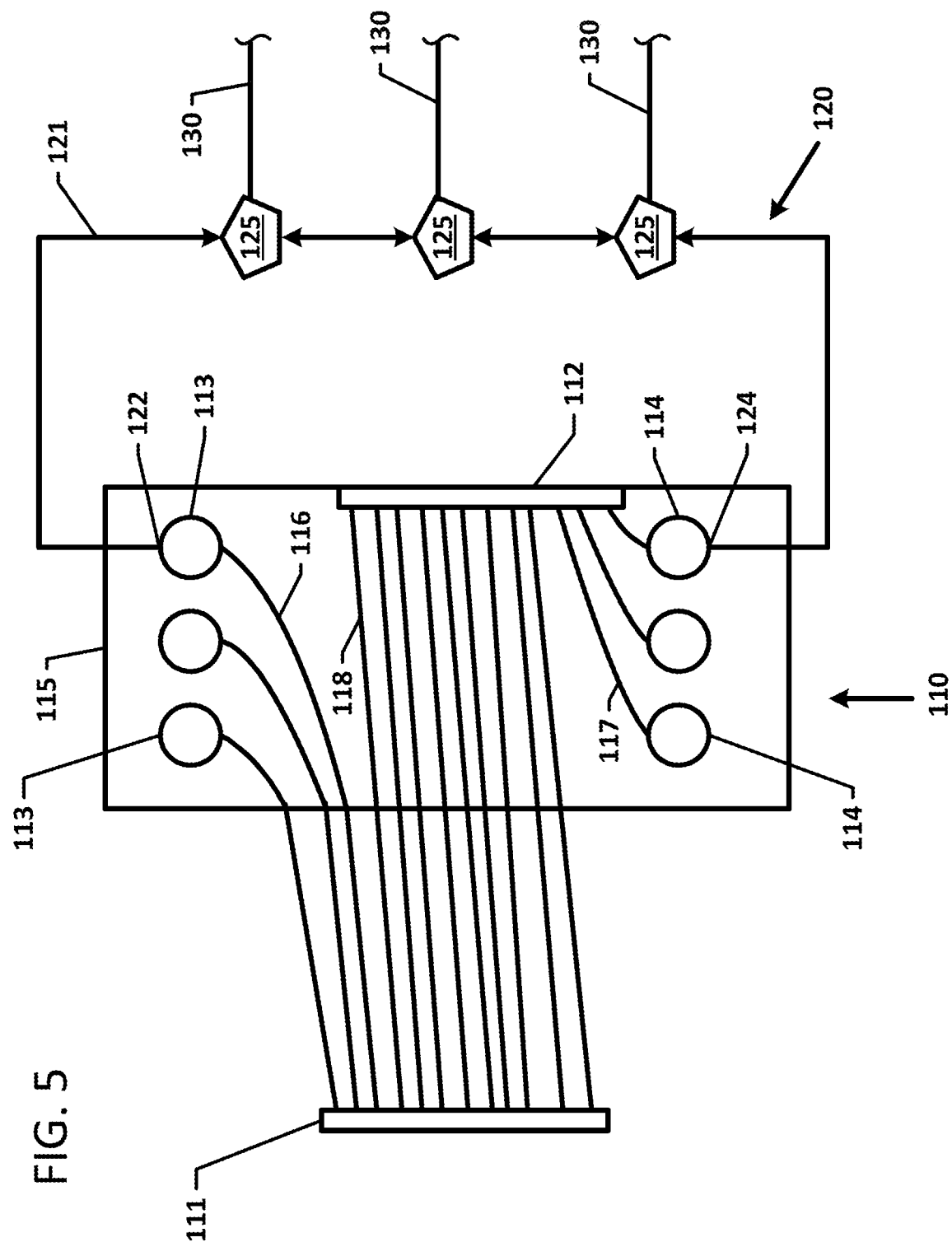
FIG. 5 is an enlarged view of another example implementation of the looped cable pathway of FIG. 2 including tap arrangements.

Referring to FIGS. 2, 3, and 5, one or more tap arrangements 125 are disposed along the redundant optical pathway 120. Each tap arrangement 125 directs a portion of the feed signal to a drop line 130. Each drop line 130 has at least one optical fiber. In certain implementations, the drop line 130 includes a plurality of optical fibers.

Figure 4:
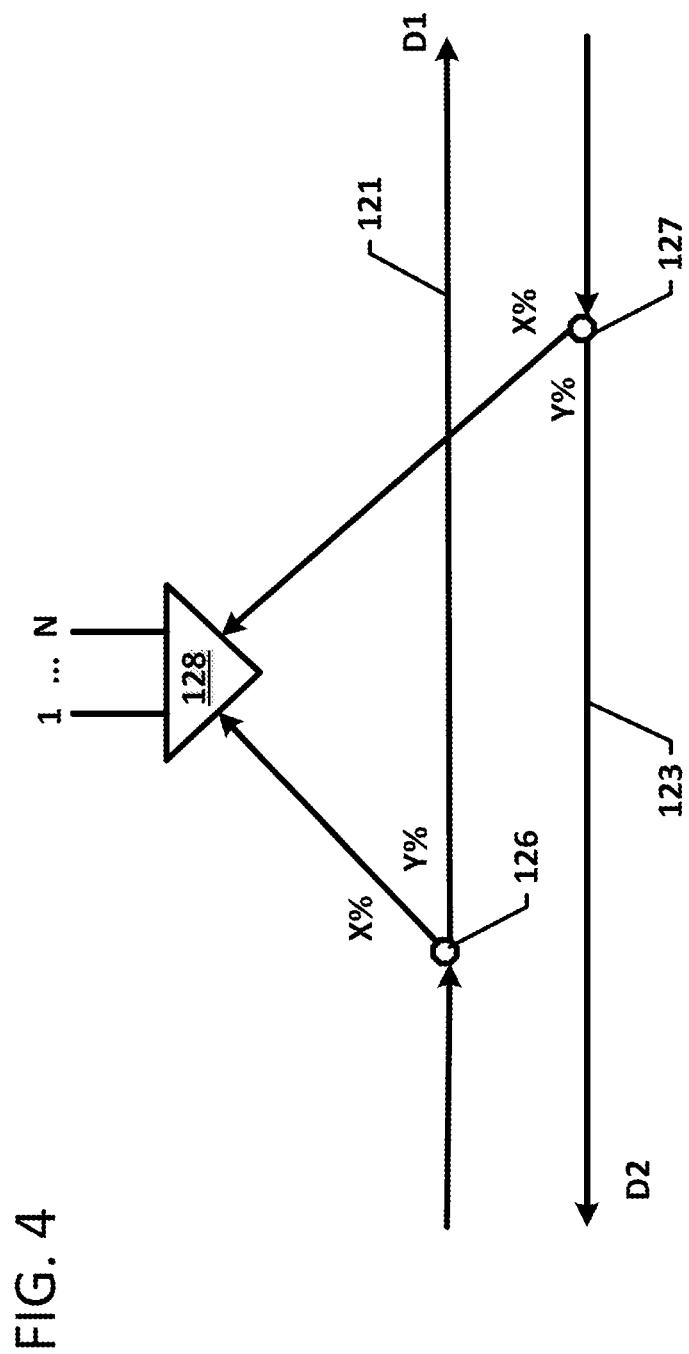
FIG. 4 illustrates an example implementation of a tap arrangement suitable for use with the looped cable pathway of FIG. 3.
Figure 6:
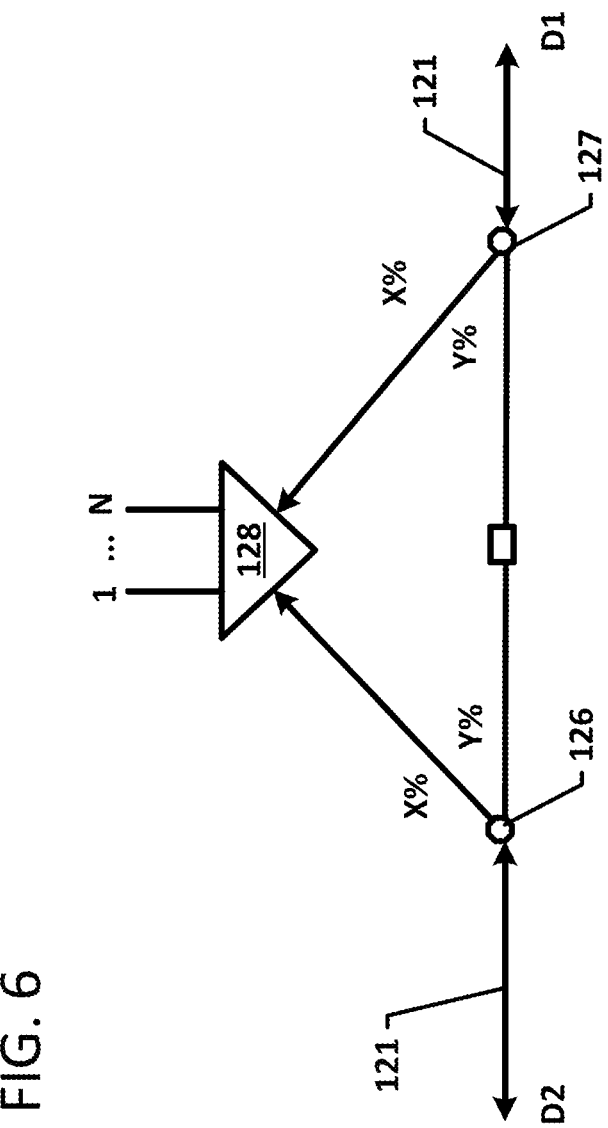
FIG. 6 illustrates an example implementation of a tap arrangement suitable for use with the looped cable pathway of FIG. 5.

Referring to FIGS. 4 and 6, each tap arrangement 125 includes a first coupler 126, a second coupler 127, and a 2×N optical splitter 128. The optical splitter 128 receives a first input from the first coupler 126 and a second input from the second coupler 127. The optical splitter 128 combines the optical signals received over the first and second inputs onto one or more fibers. In the example shown, the optical splitter 128 combines the optical signals onto 1 to N optical fibers of a drop line 130.

Each of the first and second couplers 126, 127 is configured to tap off some power from the feed signal carried over the redundant optical path 120. In certain implementations, the first and second couplers 126, 127 of the same tap arrangement 125 tap off an equal amount of the signal.

In some implementations, each tap arrangement 125 along the redundant optical pathway 120 taps off the same percentage of the signal from the pathway 120. In such implementations, the same tap arrangement 125 can be placed at multiple locations along the redundant optical pathway 120. For example, the first coupler 126 of each tap arrangement 125 may tap off about 5%, about 10%, about 20%, about 25%, etc. of the signal received at the first coupler 126. Accordingly, the actual power of the signal tapped at each subsequent tap arrangement 125 is less than at the previous tap arrangement 125 (since the signal from which the portion is being tapped is weaker).

In certain examples, the percentage to be tapped off may be selected by determining the threshold (e.g., minimum) signal strength needed at the final tap and selecting a percentage that will result in such threshold signal strength at the final tap. In such examples, the signal strength of the first tap may be significantly more powerful than needed for the application.

In other implementations, each tap arrangement 125 along a redundant optical pathway 120 taps the same amount of power from the signal. For example, each first coupler 126 may tap about 5%, about 10%, about 20%, about 25%, etc. of the total power of the signal received at the forward connection location 113. To accomplish such a tap, the first couplers 126 of a first tap arrangement 125 must tap off a different percentage of the signal from the first coupler 126 of a second tap arrangement 125.

In an illustrative example having four tap arrangements, the first tap arrangement 125 may tap off about 20% of the signal, the second tap arrangement 125 may tap off about 25% of the signal, the third tap arrangement 125 may tap off about 33% of the signal, and the fourth tap arrangement 125 may tap off about 50% of the signal. In such an example, the same amount of signal power would be tapped off at each tap arrangement 125. In other examples, however, the actual percentages being tapped can vary.

Referring now to FIG. 3, in some implementations, the redundant optical pathway 120 is formed by a first optical fiber 121 and a second optical fiber 123. The first optical fiber 121 has a first end 122 that is received at the forward output 113. The second optical fiber 123 has a first end 124 that is received at the rearward output 114. Each tap arrangement 125 is optically coupled to both the first optical fiber 121 and the second optical fiber 123. It is noted that the terms "first optical fiber" and "second optical fiber" are not meant to be limited to unbroken lengths of waveguides. Each of the first and second optical fibers 121, 123 can be formed from multiple optical fibers spliced or connected together. However, the first and second optical fibers 121, 123 are sufficiently separate to form a forward signal pathway and a separate rearward signal pathway.

FIG. 4 illustrates an example tap arrangement 125 suitable for use with the first and second optical fibers 121, 123 of FIG. 3. The tap arrangement 125 includes a first coupler 126 on the first optical fiber 121 and a second coupler 127 on the second optical fiber 123. The first coupler 126 taps off a portion of the signal carried in a first direction D1 over the first optical fiber 121 and inputs the portion to the splitter 128. In certain implementations, the first coupler 126 does not tap off any signal carried in the second direction D2. The second coupler 127 taps off a portion of the signal carried in a second direction D2 over the second optical fiber 123 and inputs the portion to the splitter 128. In certain implementations, the second coupler 127 does not tap off any signal carried in the first direction D1.

Referring now to FIG. 5, in some implementations, the redundant optical pathway 120 is formed by a single optical fiber 121 having a first end 122 that is received at the forward output 113 and a second end 122' received at the rearward output 114. It is noted that the term "single optical fiber" is not meant to be limiting. The single optical fiber 121 can be formed from multiple optical fibers spliced or connected together. However, all fibers along the redundant optical pathway 120 are optically coupled such that only one signal path is formed to carry both forward and rearward signals.

FIG. 6 illustrates another example tap arrangement 125 suitable for use with the single optical fiber 121 of FIG. 5. The tap arrangement 125 includes a first coupler 126 on the single optical fiber 121 and a second coupler 127 on the single optical fiber 121. The first coupler 126 taps off a portion of the signal carried in a first direction D1 over the single optical fiber 121 and inputs the portion to the splitter 128. In certain implementations, the first coupler 126 does not tap off any signal carried in the second direction D2. The second coupler 127 taps off a portion of the signal carried in a second direction D2 over the single optical fiber 121 and inputs the portion to the splitter 128. In certain implementations, the second coupler 127 does not tap off any signal carried in the first direction D1.

In certain examples, the splitter 128 is configured to determine whether the feed signals are being carried in the first direction D1 or the second direction D2. For example, the splitter 128 can include electronics that communicate with the signal source 101 or otherwise track the direction of the feed signals. The signal 128 can be configured to pass on signals only received from the feed signal direction and to ignore any signals received from the opposite direction.

While it is preferred for the indexing network disclosed above to have a bidirectional architecture, the designs and features disclosed herein may have applications to indexing networks with single directional architecture. For example, the tap arrangements can be deployed along indexing component drop lines to extend the reach of the drop lines in a single direction indexing environment.

Figure 8:
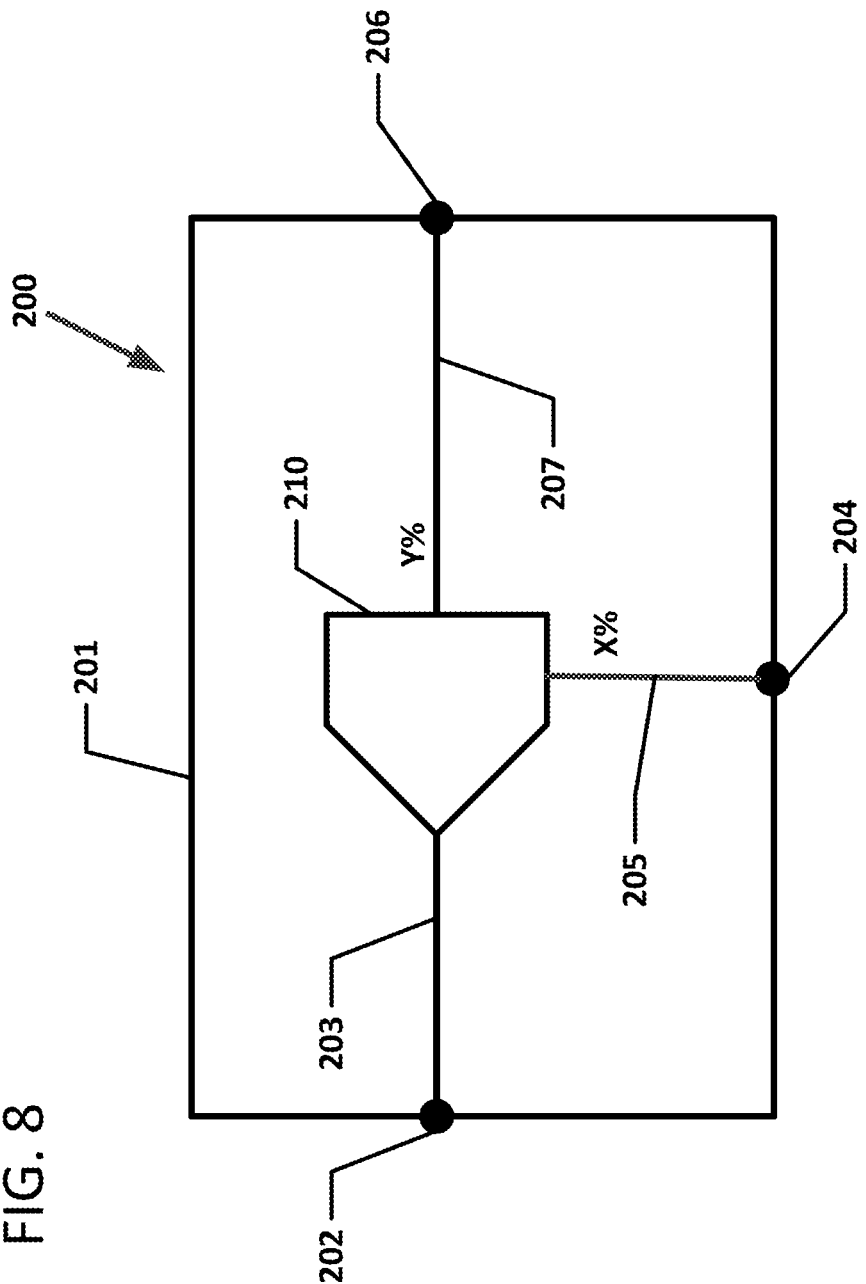
FIG. 8 illustrates an optical network node including an optical tap.

FIG. 8 illustrates an optical network node 200 including an optical tap 210. Such an optical network node 200 can be used in various optical systems as will be described in more detail herein. For example, certain types of optical network nodes 200 are suitable for use as the tap arrangements described above.

An example optical network node 200 includes an input line 203, a first output line 205, and a second output line 207. The optical tap 210 asymmetrically splits out a first portion (e.g., X %) of any optical signal received at the input line 203 from a remainder (e.g., Y %) of the optical signal. The optical tap 210 splits the first portion of the optical signal onto the first output line 205. The optical tap 210 allows the remainder of the optical signal to pass to the second output line 207. For example, the optical tap 210 taps X % of the optical power onto the first output line 205 and directs a remainder of the power onto the second output line 207.

It is noted that the terms "input" and "output" are used for convenience and are not intended to be limiting. Optical signals tend to travel in more than one direction along an optical network (e.g., from a central office to a subscriber and from a subscriber to a central office). Accordingly, optical signals are received at both the designated input and at the designated output of the node 200. As the terms are used herein, optical signals received at the input line 203 of the node 200 are split onto the output lines 205, 207; optical signals received at the output lines 205, 207 of the node 200 are joined onto the input line 203.

The optical tap 210 is configured so that optical power of the first portion is less than the optical power of the remainder of the optical signal. For example, in various examples, the optical power of the first portion of the optical signal is less than half the optical power of the remainder of the optical signal. In certain implementations, the optical power of the first portion is significantly less than the optical power of the remainder. In an example, the optical power of the first portion of the optical signal is no more than a third the optical power of the remainder of the optical signal. In an example, the optical power of the first portion of the optical signal is no more than a quarter the optical power of the remainder of the optical signal. In an example, the optical power of the first portion of the optical signal is no more than a tenth the optical power of the remainder of the optical signal.

A housing 201 of the network node 200 supports or encloses the optical tap 210. In certain implementations, the optical tap 210 is disposed within an interior of the housing 210. In other examples, the housing 201 carries the optical tap 210. The housing 201 has an input 202, a first output 204, and a second output 206. The input 202 is optically coupled to the input line 203 of the optical tap 210. The first output 204 is optically coupled to the first output line 205 of the optical tap 210. The second output 206 is optically coupled to the second output line 207 of the optical tap 210.

Optical signals received at the input 202 are carried over the input line 203 to the optical tap 210. The first portion of the optical signal is carried from the optical tap 210, over the first output line 205, to the first output 204, and out of the housing 201 without being further split. The remainder of the optical signal is carried from the optical tap 210, over the second output line 207, to the second output cable interface location 206, and out of the housing 201 without being further split.

In some implementations, the input 202, first output 204, and/or second output 206 are de-mateable connection interfaces (e.g., plug connectors or optical adapter ports). In other implementations, the input 202, first output 204, and/or second output 206 are glands or other apertures through which a cable can extend. In certain implementations, the demateable connection interface is ruggedized (i.e., mechanically robust and configured to be environmentally sealed). In other implementations, the input 202, first output 204, and/or second output 206 includes a splice region of the housing 201.

In an example, the input 202 includes a plug connector terminating the input line 203, which extends out of the housing 201; and the outputs 204, 206 include optical ports configured to receive plug connectors. In another example, the input 202 and outputs 204, 206 each include optical adapters having inner ports and outer ports. The inner ports receive connectorized ends of the input line 203, first output line 205, and second output line 207. The outer ports are configured to receive plug connectors.

In some implementations, the input 202, the first output 204, and/or the second output 206 are accessible from an exterior of the housing 201. In an example, one or more plug connection ports can be disposed at a periphery of the housing 201. In an example, one or more connectorized stub cables can extend through the housing 201 so that the connectorized ends are located outside the housing 201. In other implementations, the input 202, the first output 204, and/or the second output 206 are disposed within an interior of the housing 201 and are not accessible from an exterior of the housing 201. For example, the housing 201 can include a sealed cable port through which the cables pass so that ends of the cables are disposed within a sealed interior of the housing 201. Within the sealed interior, the cable ends can be spliced or plugged into the lines 203, 205, 207 of the optical tap 210.

Figure 9:
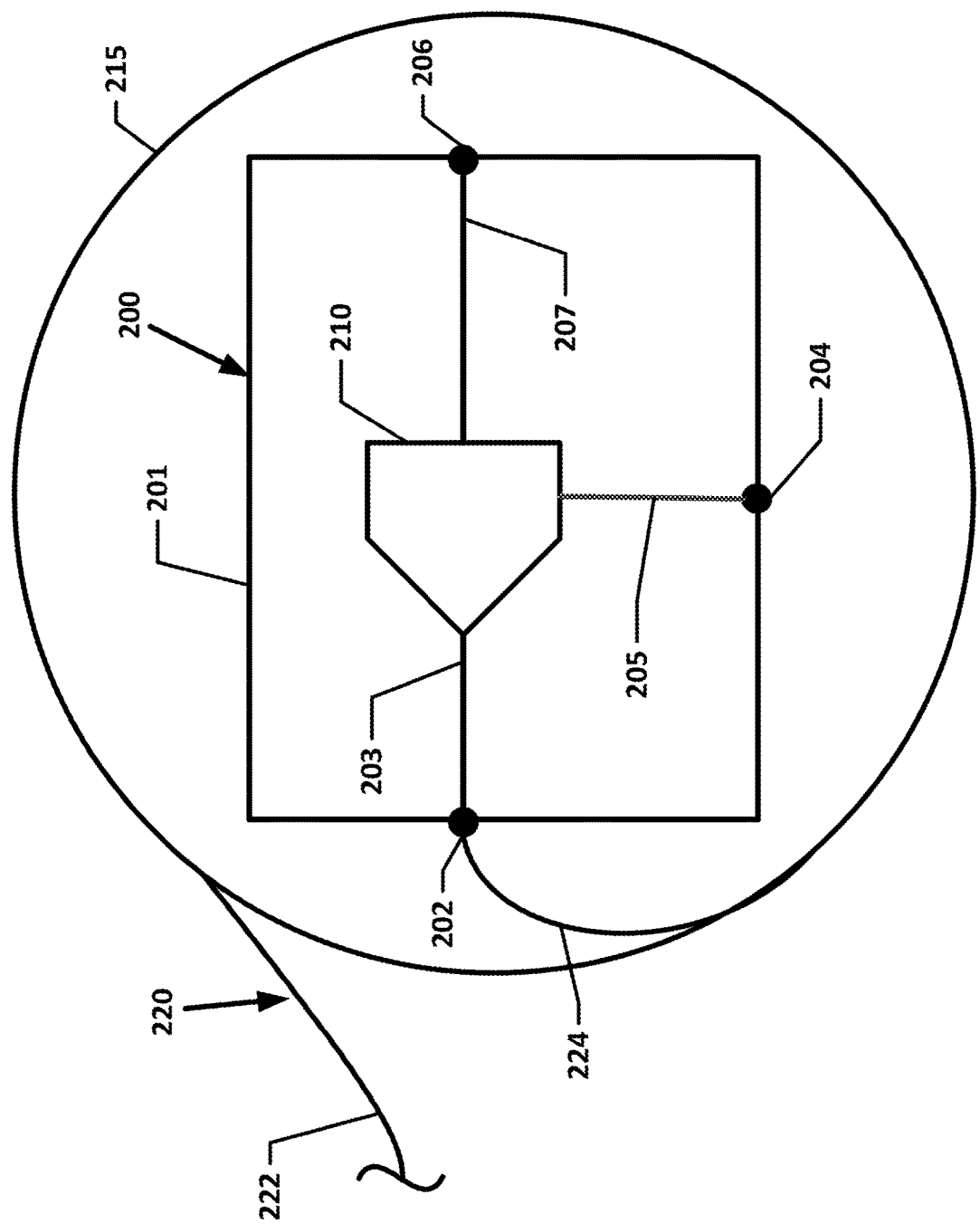
FIG. 9 shows an optical network node mounted on a cable spool to rotate in unison with the cable spool to dispense an optical cable from the cable spool.

Referring to FIG. 9, in certain implementations, the housing 201 of the optical network node 200 is mounted on a cable spool 215 to rotate in unison with the cable spool 215 to dispense an optical cable 220 from the cable spool 215. The optical cable 220 has a first end 224 that optically couples to the input line 203 of the optical tap 210 (via input 202). The optical cable 220 has an opposite second end 222 that is dispensed from the spool 215 when pulled. In some examples, the first end 224 of the cable 220 is optically coupled to the input line 203 after paying out the cable 220. In other examples, the first end 224 is optically coupled to the input line 203 while the cable 220 is being paid out from the cable spool 215.

In certain implementations, two or more of the optical network nodes 200 can be daisy-chained together as part of an optical network. In such implementations, the second output 206 of one of the optical network nodes 200 in a chain is optically coupled to the input 202 of a subsequent one of the optical network nodes 200. Accordingly, optical signals carried over the input line 203 of a first optical network node 200 in the chain are split (i.e., power split) at a first tap 210 so that a portion of the optical signal passes to the first output 204 and a majority of the optical signal passes to a subsequent network node 200 in the chain via the second output 206 of the first network node 200.

In some examples, the optical taps 210 of the optical network nodes 200 are configured to split off a common power percentage of the optical signals to the first outputs 204. Accordingly, each output 204 along the chain receives a different amount of power. In other examples, the optical taps 210 are configured to split off different percentages of power so that a common amount of power is supplied to each of the first outputs 204 along the chain.

Figure 10:
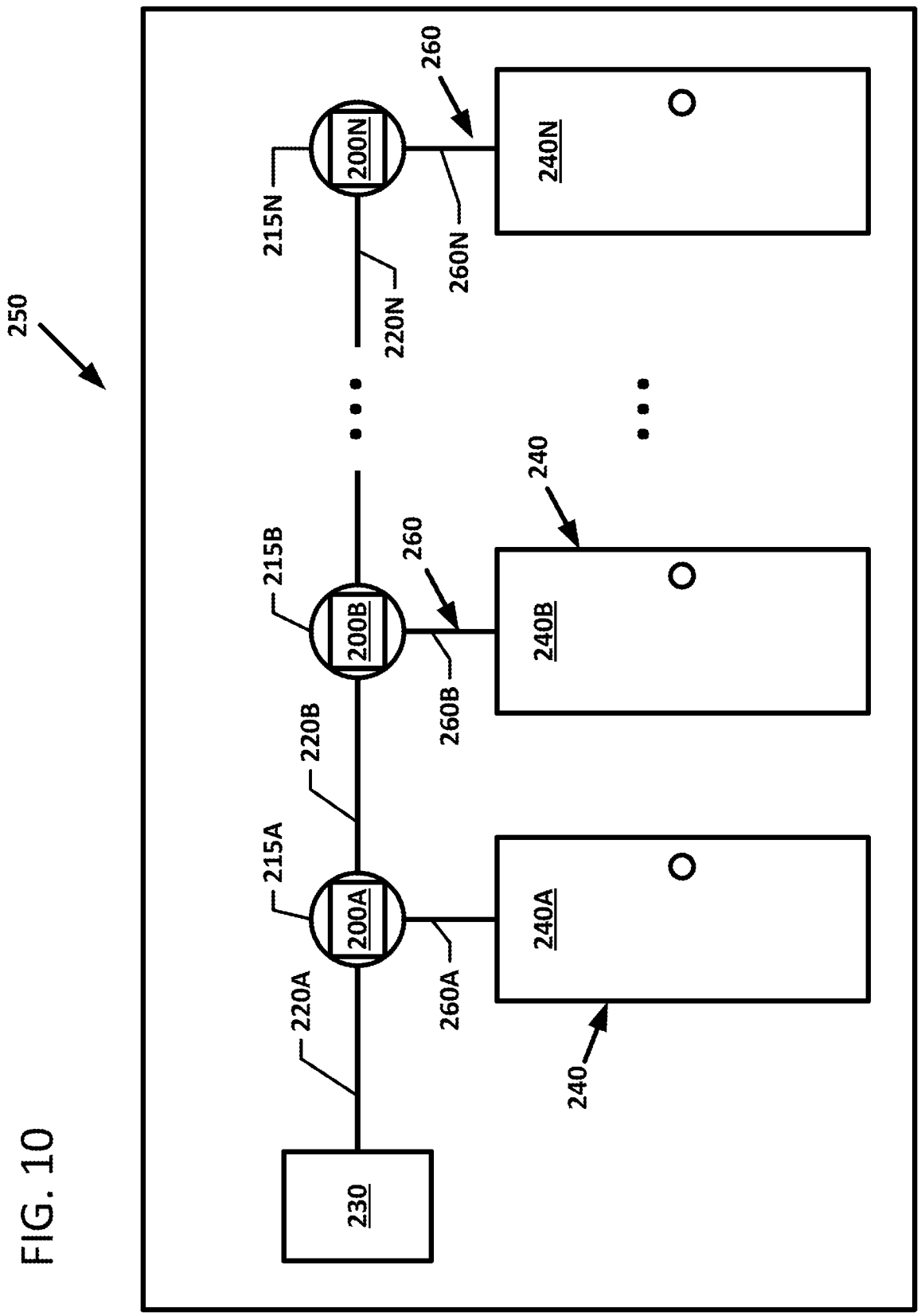
FIG. 10 illustrates a chain of optical network nodes suitable for use in a fiber distribution environment, such as a multi-dwelling unit.

Referring to FIG. 10, in some implementations, the chain of optical network nodes 200 is suitable for use in a fiber distribution environment (e.g., inside a building 250). For example, the chain of network nodes 200 can be used in a multi-dwelling unit, a shopping mall, an office building, etc. In the example shown, the chain includes a first optical network node 200A, a second optical network node 200B, and a last optical network node 200N. Additional optical network nodes 200 may be supplied between optical network node 200B and optical network node 200N.

A first optical cable 220A optically couples the first optical network node 200A to a floor box 230, which is optically coupled to a communications network. A second optical cable 220B optically couples the second optical network node 200B to the first optical network node 200A. A Nth optical cable 220N optically couples the Nth optical network node 200N to the subsequent node in the chain (e.g., the second optical network node 200B). For example, the second end 222 of each cable 220B ... 220N is optically connected to the second output 206 of the subsequent optical network node 200A, 200B. In some examples, each of the cables 220A, 220B ... 220N are deployed from a spool 215 on which the corresponding node 200A, 200B ... 200N are mounted.

In an example, a first of the optical network nodes 200A in the chain has an input 202 that is optically coupled to a floor box 230. In the example shown, the input 202 is a connectorized end of the cable 220A. Part of the cable 220A is wound around a spool 215 that carries the optical network node 200A. The opposite end of the cable 220A is optically coupled to the input line 203 of the optical tap 210 of the network node 200A. The housing 201 of the optical network node 200A defines a first output port 204 and a second output port 206 accessible from an exterior of the housing 201.

In some examples, the first output port 204 is a single-fiber output port. In other examples, however, the first output port 204 can be a multi-fiber output port (e.g., an MPO port, a duplex LC port, an HMFOC port, etc.). In certain examples, the second output port 206 is a multi-fiber output port (e.g., an MPO port, an HMFOC port). In some examples, the first and second output ports 204, 206 are ruggedized ports. In other examples, the first and second ports 204, 206 are not ruggedized ports.

The floor box 230 can be coupled to the communications network via a drop cable, a riser cable, or other optical connection. In some examples, the building 250 includes multiple floors and each floor may have a corresponding floor box 230 coupled to a building distribution point (e.g., a fiber distribution hub). Optical signals from a central office of the communications network are supplied to the building distribution point, at which the signals are directed to the floor boxes 230. In other examples, the chain can be connected directly to the building distribution point.

In some such examples, a subscriber line 260 optically couples the first output 204 of each node 200A ... 200N to a subscriber 240 at the building. For example, the portion of the optical signal tapped at each optical network node 200 is carried through the first output 204 and over a subscriber line 206 to a room of the multi-dwelling unit, a shop at the shopping mall, an office of the office building, or another type of subscriber. In certain implementations, the subscriber line carries the portion of the optical signal from the first output 204 to the subscriber 206 without further splitting the portion of the optical signal.

In the example shown, a first subscriber line 260A connects a first subscriber 240A (shown diagrammatically as an apartment door) to the first output 204 of the first network node 200A. A second subscriber line 260B connects a second subscriber 240B to the first output 204 of the second network node 200B. An Nth subscriber line 260N connects an Nth subscriber 240N to the first output 204 of the Nth network node 200N. In some examples, the strength of the signal received by the Nth subscriber 240N is less than the strength of the signal received by the first subscriber 240A. In certain examples, the strength of the signal received by each subsequent subscriber 240A-240N in the chain is progressively less than the strength at the previous subscriber. In still other examples, each subscriber 240A-240N can receive a signal having a common strength.

In some implementations, each subscriber line 260A is routed to equipment disposed at the subscriber 260. For example, each subscriber line 260A can be routed through a wall, door, or window into a room belonging to the subscriber. The subscriber line 260 can be plugged into an Optical Network Terminal (ONT) or other equipment in the room.

Figure 11:
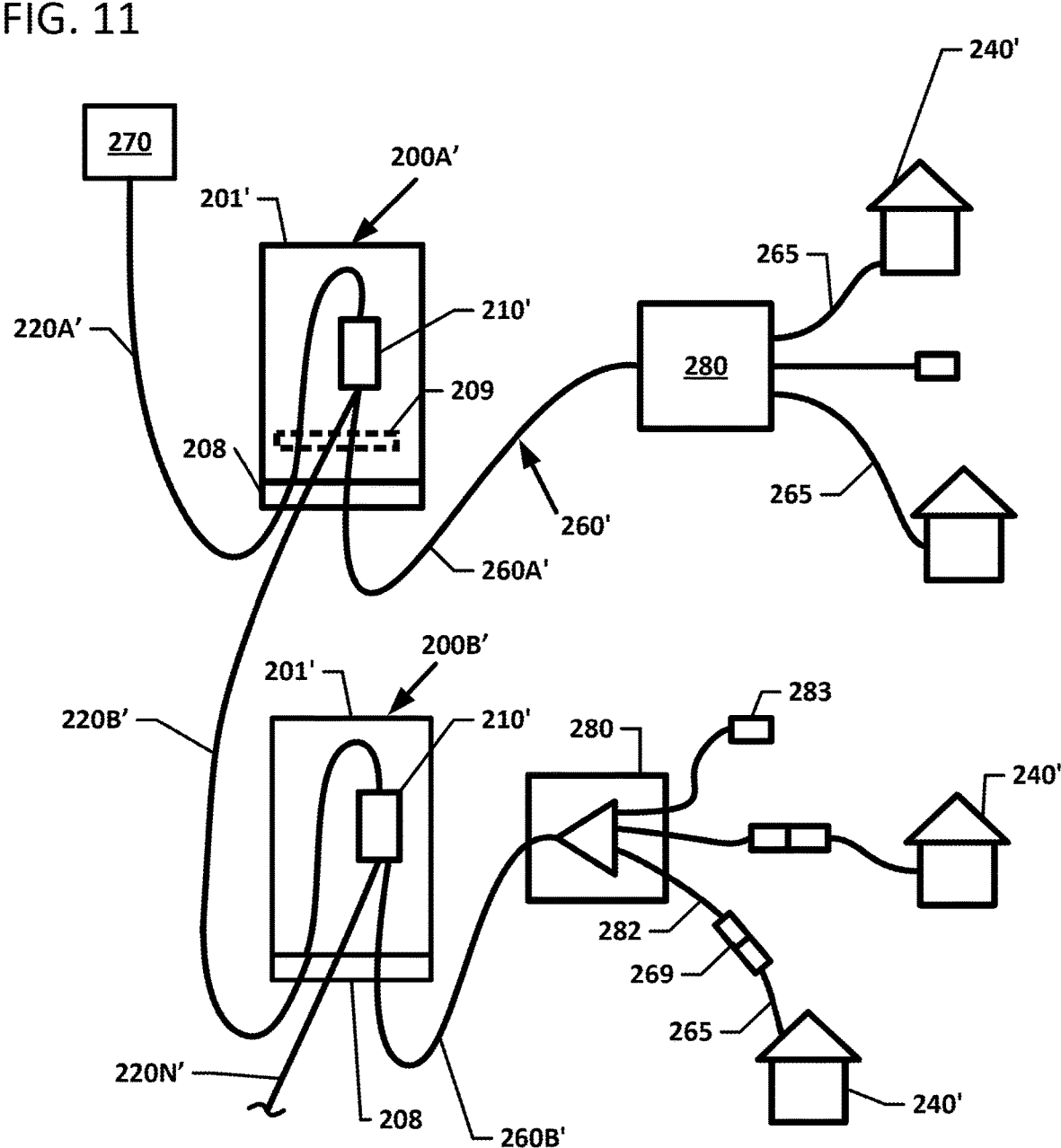
FIG. 11 illustrates an alternative indexing chain environment for optical network nodes at which an input line, a first output line, and a second output line are not accessible from an exterior of a housing of the node, the first output line being coupled to a remote splitter module, which further splits the optical signal before the optical signals reach the subscribers.

FIG. 11 illustrates an alternative indexing chain environment for optical network nodes 200'. Each node 200' includes an optical tap 210'. At least two optical network nodes 200' are chained together so that an optical cable 220B' optically couples the input line 203 of the optical tap 210' of the second node 200B' to the second output line 207 of the optical tap 210' of the first node 200A'. The input line 203 of the first node 200A' is optically coupled to a central office 270 or otherwise coupled to a communications network. The first output line 205 of the optical tap 210' of the first node 200A' is optically coupled to a cable 260A' extending out of the housing 201' of the node 200A'.

In some implementations, the input line 203, first output line 205, and second output line 207 are not accessible from an exterior of the housing 201' of the node 200A', 200B'. Rather, cables pass through a sealed region 208 (e.g., a gasket, gel, or other sealing mechanism) to an interior of the housing 201'. Within the interior, the cables can be spliced (e.g., see splice region 209), optically connected, or otherwise optically coupled to the input line 203, first output line 205, and second output line 207.

In certain examples, the housing 201' includes a first housing piece and a second housing piece that couple together at a sealing region 208 to seal the interior of the housing 201'. The sealing region 208 defines cable pass-through locations through which cables enter the interior of the housing 201' to reach the input line 203, the first output line 205, and/or the second output line 207.

In certain implementations, the first output line 205 of an optical network node 200' is coupled to a remote splitter module 280, which further splits the optical signal before the optical signals reach the subscribers 240'. The optical splitter module 280 is disposed at a location spaced from the housing 201'. In some examples, the splitter module 280 defines a plurality of output ports at which drop cables 265 can be connected. In other examples, the splitter module 280 includes pigtail outputs 282 having connectorized ends 283. A connectorized end of a drop cable 265 can be optically coupled (see 269) to the connectorized end 283 of one of the splitter pigtails 282 to connect a subscriber 240' to the network.

In certain implementations, the optical signals split by the optical tap 210' at a node 200' are not split again until reaching the splitter module 280. Example splitter modules suitable for use with the network nodes 200, 200' are disclosed in U.S. Pat. No. 7,444,056 and U.S. Pat. No. RE 43,762, the disclosures of which are hereby incorporated herein by reference. Alternatively, the optical tap 210' can split the signals onto multiple fibers of a cable. In such implementations, the cable can be broken out at as shown in WO 2014/197894 and WO 2014/167447, the disclosures of which are hereby incorporated herein by reference.

Outputs of the splitter module 280 are directed to subscribers 240' (e.g., via drop cables 265. In certain examples, the drop cables 265 are tether cables having connectorized ends. For example, see U.S. Pat. No. 7,744,286, the disclosure of which is hereby incorporated herein by reference. An additional cable 267 can be optically coupled to the tether 265 at a connection point 269. The additional cable 267 can be routed between the tether 265 and the subscriber 240.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A system comprising:
an indexing component having a demateable first multi-fiber connection location, a demateable second multi-fiber connection location, a demateable first output connection location, and a demateable second output connection location, the indexing component including a first optical fiber extending from the first multi-fiber connection location to the first output connection location, a second optical fiber extending from the second multi-fiber connection location to the second output connection location, and additional optical fibers indexed between the first and second multi-fiber connection locations, the first multi-fiber connection location being configured to receive feed signals in a forward direction and the second multi-fiber connection location being configured to receive feed signals in a reverse direction;
a redundant fiber path extending between the first output connection location and the second output connection location; and
a fiber tap arrangement disposed along the redundant fiber path, the fiber tap arrangement including a first coupler, a second coupler, and a 2×N optical splitter, the first coupler tapping off the feed signal from the redundant fiber path if the feed signal is carried in the first direction, the second coupler tapping off the feed signal from the redundant fiber path if the feed signal is carried in the second direction, the first and second couplers providing any tapped off feed signals to the 2×N optical splitter.

2. The system of claim 1, wherein the redundant fiber path includes a first optical fiber coupled to the first output connection location and a second optical fiber coupled to the second output connection location.

3. The system of claim 2, wherein the first coupler of the fiber tap arrangement is disposed along the first optical fiber and the second coupler of the fiber tap arrangement is disposed along the second optical fiber.

4. The system of claim 1, wherein the redundant fiber path includes a single optical fiber.

5. The system of claim 4, wherein the first and second couplers of the fiber tap arrangement are disposed along the single optical fiber.

6. The system of claim 1, wherein the fiber tap arrangement is one of a plurality of fiber tap arrangements, each fiber tap arrangement including a respective first coupler, a respective second coupler, and a respective 2×N optical splitter, each first coupler tapping off the feed signal from the redundant fiber path if the feed signal is carried in the first direction, each second coupler tapping off the feed signal from the redundant fiber path if the feed signal is carried in the second direction, the first and second couplers providing any tapped off feed signals to the respective 2×N optical splitters.

7. The system of claim 6, wherein each first coupler is disposed along a first optical fiber of the redundant fiber path and each second coupler is disposed along a second optical fiber of the redundant fiber path.

8. The system of claim 6, wherein each of the first and second couplers is disposed along a single optical fiber of the redundant fiber path.

9. The system of claim 1, wherein the first multi-fiber connection location includes an adapter port or female connector.

10. The system of claim 1, wherein the first multi-fiber connection location includes a plug connector connector.

11. The system of claim 1, wherein the second multi-fiber connection location includes a port.

12. The system of claim 1, wherein the second multi-fiber connection location includes a connector terminating a stub cable.

13. The system of claim 1, wherein the first output port is one of a plurality of first output ports, each first output port being configured to receive a respective optical fiber extending from the first multi-fiber cable port.

14. The system of claim 13, wherein the second output port is one of a plurality of second output ports, each second output port being configured to receive a respective optical fiber extending from the second multi-fiber cable port.

15. The system of claim 1, wherein the indexing component is one of a plurality of indexing components, each indexing component having a respective first multi-fiber cable port, a respective second multi-fiber cable port, a respective first output port, and a respective second output port, each indexing component including an optical fiber extending from the first multi-fiber cable port to the first output port, another optical fiber extending from the second multi-fiber cable port to the second output port, and additional optical fibers indexed between the respective first and second multi-fiber cable ports, the indexing components being configured to be daisy-chained together.

16. A bi-directional indexing system in which signals supplied from a central office can be selectively routed in a forward or rearward direction, the system comprising:

a first terminal having a first multi-fiber cable port, a second multi-fiber cable port, a first output port, and a second output port, the first terminal including a first optical fiber extending from the first multi-fiber cable port to the first output port, a second optical fiber extending from the second multi-fiber cable port to the second output port, and additional optical fibers indexed between the first and second multi-fiber cable ports, wherein signals supplied in the forward direction are received at the first multi-fiber cable port;

a second terminal having a first multi-fiber cable port, a second multi-fiber cable port, a first output port, and a second output port, the second terminal including a first optical fiber extending from the first multi-fiber cable port to the first output port, a second optical fiber extending from the second multi-fiber cable port to the second output port, and additional optical fibers indexed between the first and second multi-fiber cable ports, the first multi-fiber cable port being configured to receive feed signals in a forward direction and second multi-fiber cable port being configured to receive feed signals in a reverse direction, wherein signals supplied in the rearward direction are received at the second multi-fiber cable port;

an optical cable optically coupling the second multi-fiber cable port of the first terminal to the first multi-fiber cable port of the second terminal;

a redundant fiber path extending between the first output port of the first terminal and the second output port of the second terminal; and a fiber tap arrangement disposed along the redundant fiber path, the fiber tap arrangement including a first coupler, a second coupler, and a 2×N optical splitter, the first coupler tapping off the feed signal from the redundant fiber path if the feed signal is carried in the first direction, the second coupler tapping off the feed signal from the redundant fiber path if the feed signal is carried in the second direction, the first and second couplers providing any tapped off feed signals to the 2×N optical splitter.

17. The system of claim 16, wherein the redundant fiber path includes a first optical fiber coupled to the first output port of the first terminal and a second optical fiber coupled to the second output port of the second terminal.

18. The system of claim 17, wherein the first coupler of the fiber tap arrangement is disposed along the first optical fiber and the second coupler of the fiber tap arrangement is disposed along the second optical fiber.

19. The system of claim 16, wherein the redundant fiber path includes a single optical fiber.

20. The system of claim 19, wherein the first and second couplers of the fiber tap arrangement are disposed along the single optical fiber.

21. The system of claim 16, wherein the fiber tap arrangement is one of a plurality of fiber tap arrangements, each fiber tap arrangement including a respective first coupler, a respective second coupler, and a respective 2×N optical splitter, each first coupler tapping off the feed signal from the redundant fiber path if the feed signal is carried in the first direction, each second coupler tapping off the feed signal from the redundant fiber path if the feed signal is carried in the second direction, the first and second couplers providing any tapped off feed signals to the respective 2×N optical splitters.

22. The system of claim 16, wherein the first output port of one of the first and second terminals is one of a plurality of first output ports, each first output port being configured to receive a respective optical fiber extending from the first multi-fiber cable port.

* * * * *